J. CONTE.
CONVEYER MECHANISM.
APPLICATION FILED FEB. 26, 1913.
1,079,165.
Patented Nov. 18, 1913.
3 SHEETS—SHEET 1.
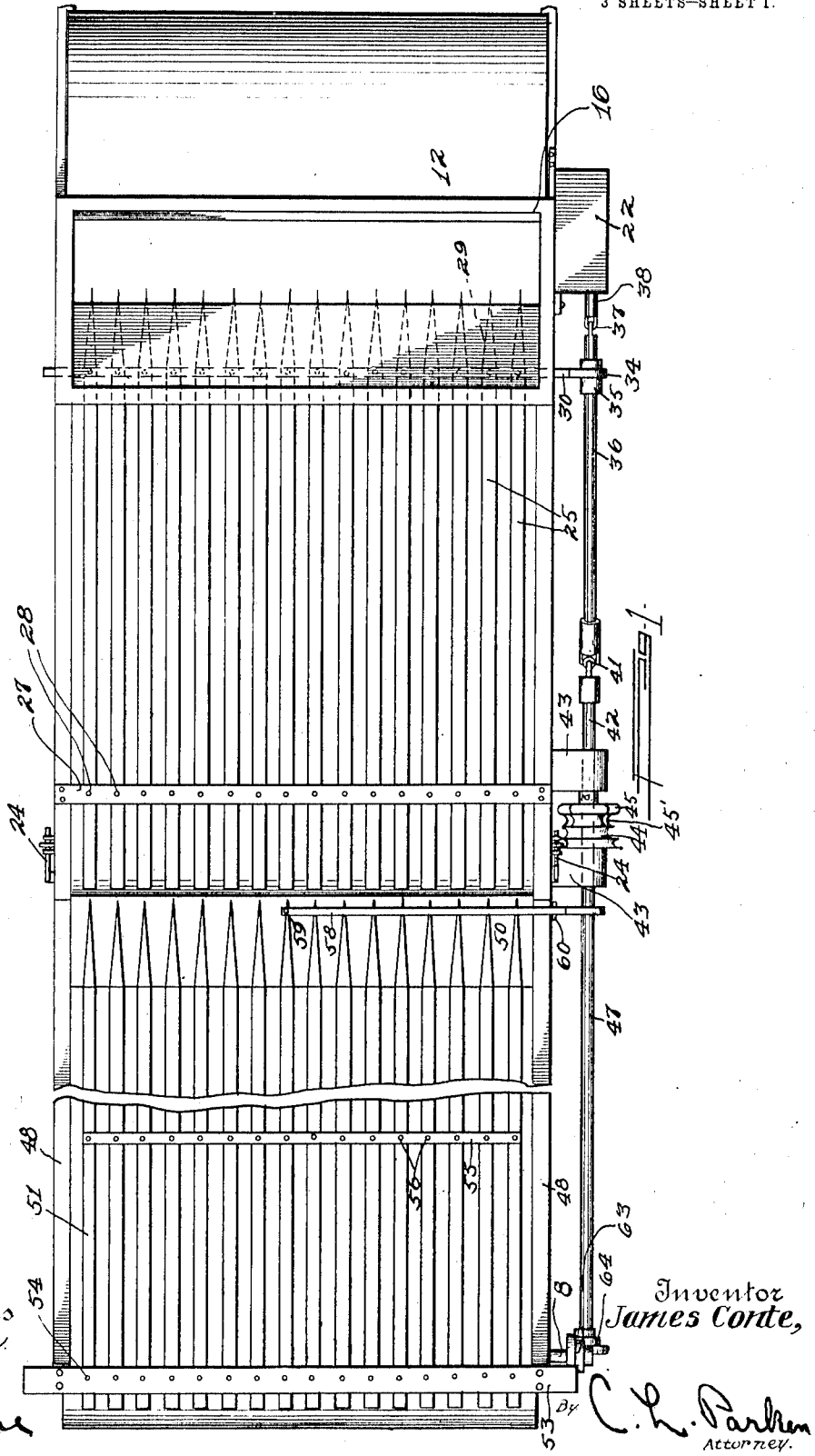
Witnesses
Inventor
James Conte,
Attorney.

J. CONTE.
CONVEYER MECHANISM.
APPLICATION FILED FEB. 26, 1913.
1,079,165.
Patented Nov. 18, 1913.
3 SHEETS—SHEET 2.
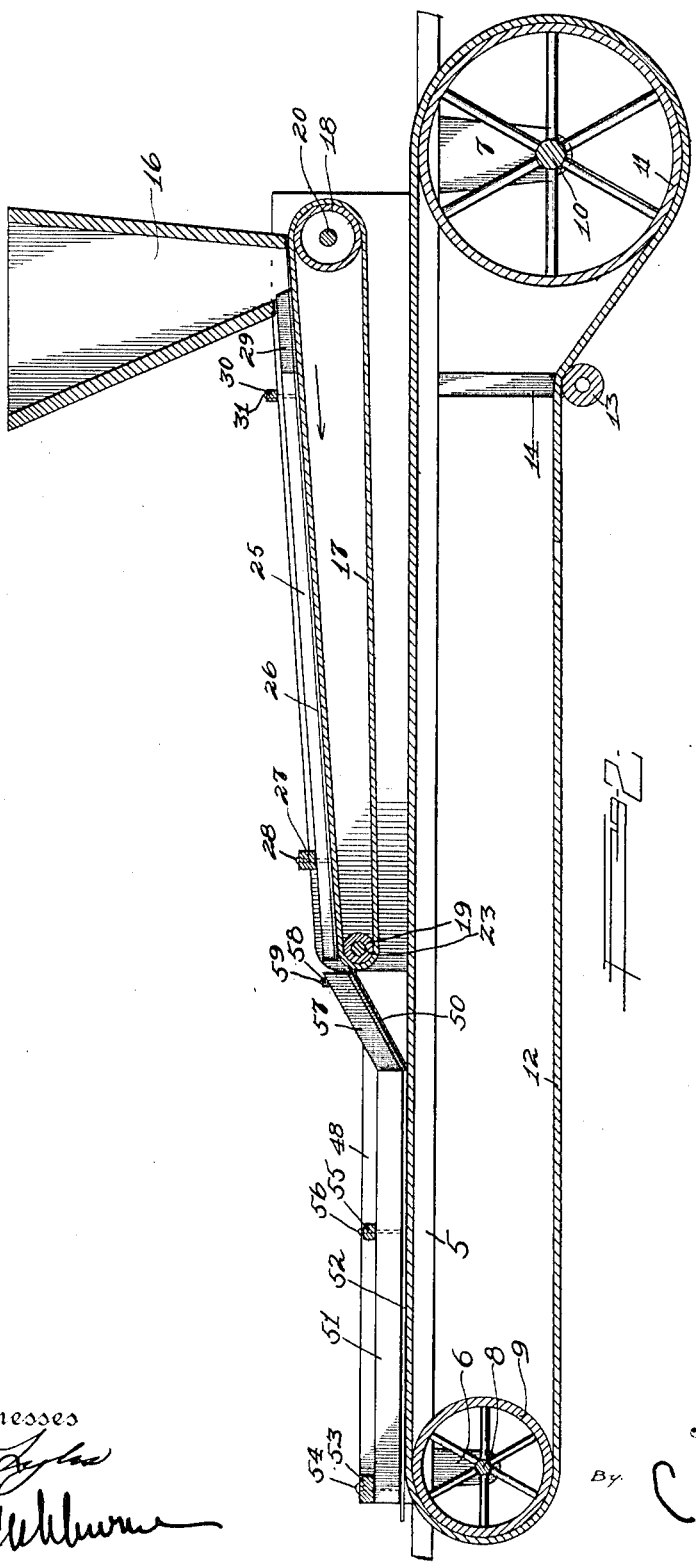
Witnesses
Inventor
James Conte,
By
Attorney

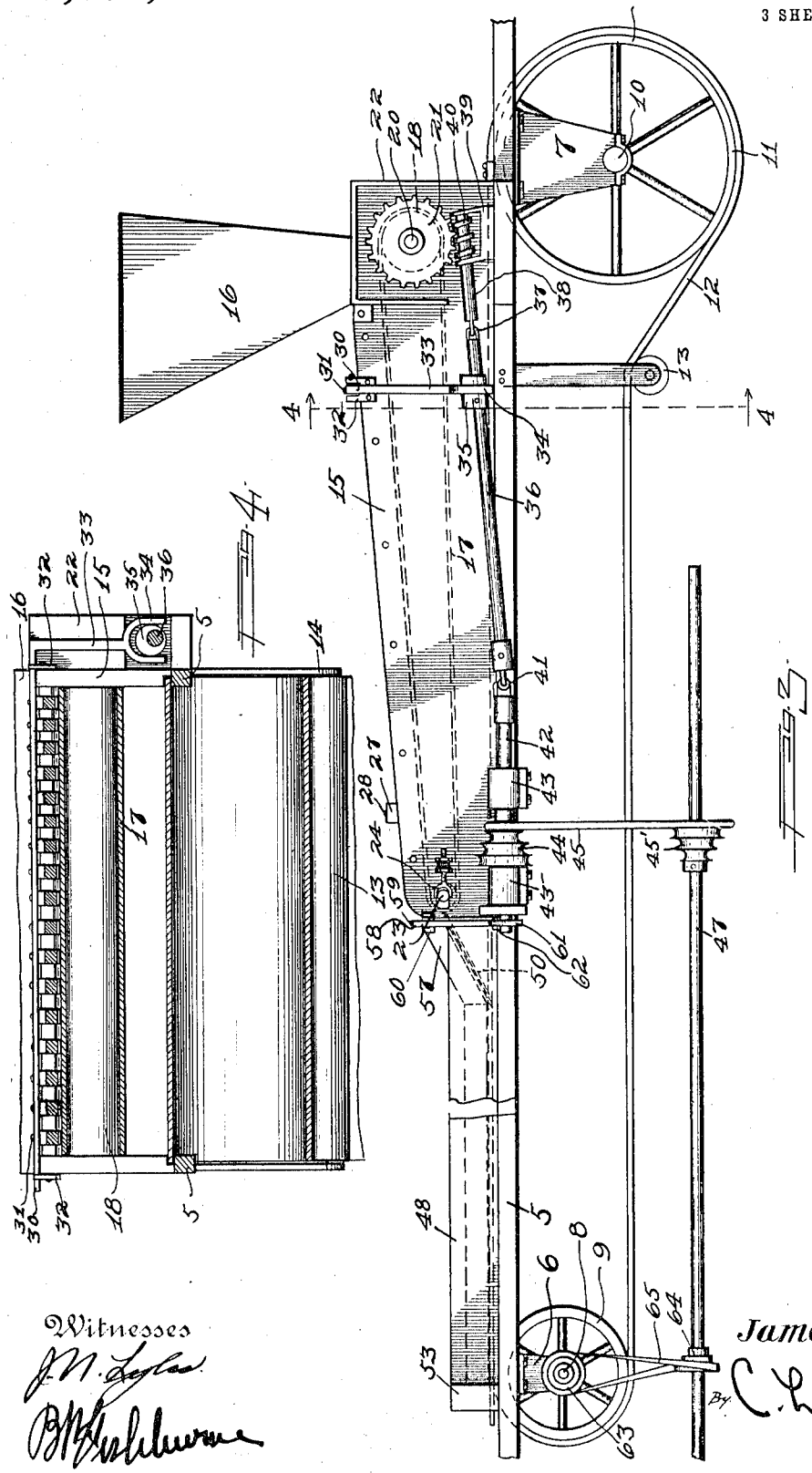

J. CONTE.
CONVEYER MECHANISM.
APPLICATION FILED FEB. 26, 1913.
1,079,165.
Patented Nov. 18, 1913.
3 SHEETS—SHEET 2.
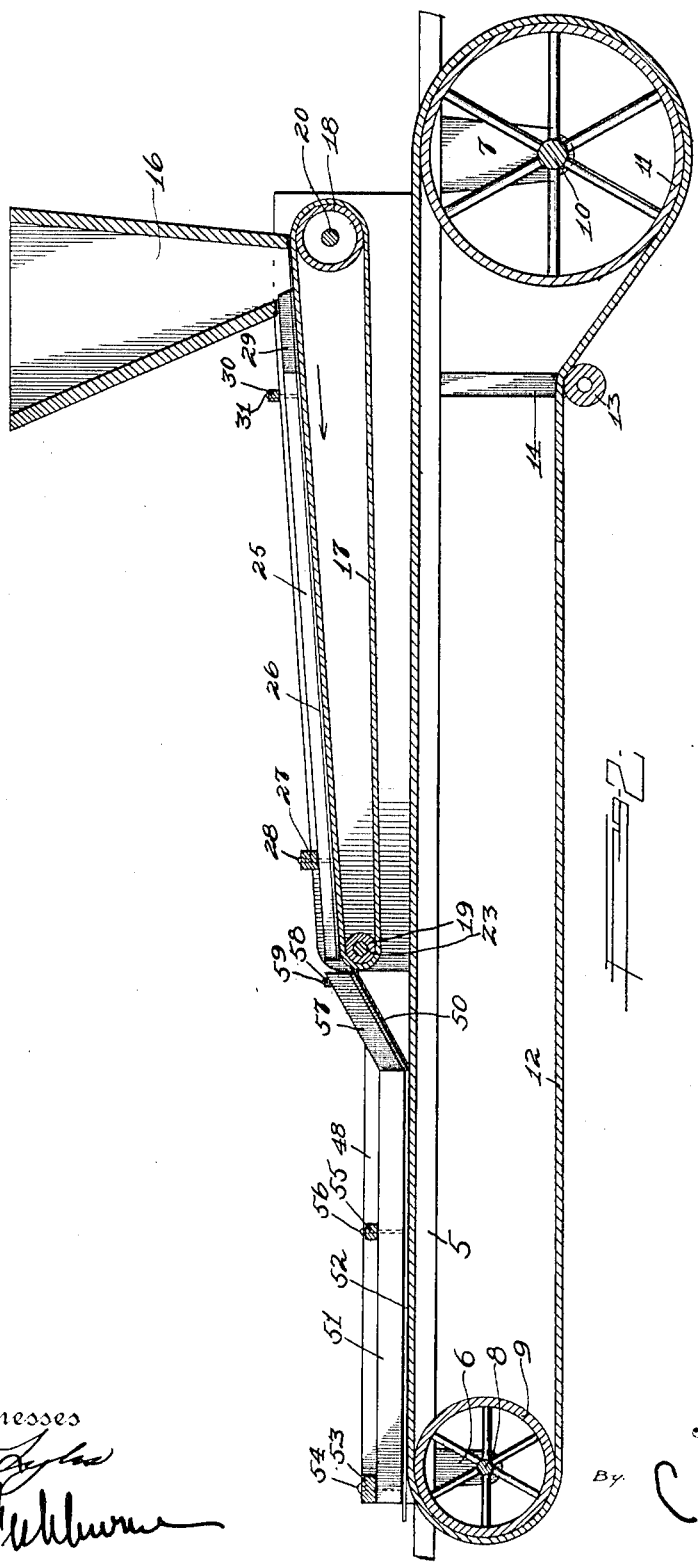
Witnesses
Inventor
James Conte,
By
Attorney